(12) United States Patent
Johnston (10) Patent No.: US 6,493,615 B1
(45) Date of Patent: Dec. 10, 2002

(54) VEHICLE DIAGNOSTIC SYSTEM

(76) Inventor: Jeffrey Johnston, 173 Coates Ave. N., Lake Ronkonkoma, NY (US) 11779

( * ) Notice: Subject to any disclaimer, the term of this patent is extended or adjusted under 35 U.S.C. 154(b) by 0 days.

(21) Appl. No.: 08/999,806

(22) Filed: Aug. 9, 1999

(51) Int. Cl.$^7$ ................................................ G06F 19/00
(52) U.S. Cl. .......................... 701/29; 701/35; 340/438; 340/460
(58) Field of Search ................ 701/29, 30, 33, 701/34, 35; 340/425.5, 438, 439, 457, 457.1, 457.2, 457.3, 457.4, 459, 460

(56) References Cited

U.S. PATENT DOCUMENTS

| | | | | |
|---|---|---|---|---|
| 4,348,653 A | * | 9/1982 | Tsuzuki et al. | 340/460 |
| 4,426,691 A | * | 1/1984 | Kawasaki | 340/460 |
| 4,839,749 A | * | 6/1989 | Franklin | 340/460 |
| 5,436,612 A | * | 7/1995 | Aduddell | 340/438 |
| 5,604,479 A | * | 2/1997 | Chang | 340/460 |
| 6,072,388 A | * | 6/2000 | Kyrtsos | 340/438 |
| 6,198,388 B1 | * | 3/2002 | Chen et al. | 340/439 |

* cited by examiner

*Primary Examiner*—Gary Chin
(74) *Attorney, Agent, or Firm*—Galgano & Burke (57) ABSTRACT

The present invention includes a system for assisting the user in the diagnosis of vehicle repairs. The system includes a computer, software program, dat storage medium, CRT and user input devices which permit the user to select from displayed menus. The user can select various sounds to be produced so as to match the sound produced by the system with that the user's vehicle is making. The system seeks to minimize the amount of time the service repairman must spend in diagnosing the problems with the user's vehicle.

2 Claims, 12 Drawing Sheets

VEHICLE DIAGNOSTIC SYSTEM

BACKGROUND OF THE INVENTION

1. Field of the Invention

The present invention relates generally to a system for facilitating the diagnosis and servicing of vehicles. More particularly, the present invention relates to a system for facilitating the diagnosis and servicing of automotive vehicles wherein a user can access audio data from a storage media via a computer.

2. Description of the Prior Art

Traditionally, vehicle owners when concerned about the performance of their vehicle, arrange to bring the subject vehicle to a repair shop. At the repair shop, the vehicle owner is asked to explain to the shop representative the type and location of the suspected problem with the vehicle. All too often however, the owner is unable to replicate in any decipherable manner, the noise or sound that the vehicle is making. Accordingly, time must be spent by shop repairman to first locate and identify the problem, then to repair the problem.

Innovations have been made to reduce the amount of owner input in diagnosing vehicle problems, however, the innovations have involved extremely high tech equipment which must be positioned, and once again, involve the time of the repairman to set up, apply, and interpret the equipment.

It is therefore an object of the present invention to provide a system for facilitating the diagnosing of vehicle repairs, which is simple to use.

It is a further object of the present invention to provide a system which is inexpensive.

Another object of the present invention is to provide a system which minimizes the time required of a repairman.

It is yet another object of the present invention to provide a system which is accurate and reliable.

Numerous innovations for crutches have been provided in the prior art. Even though these innovations may be suitable for the specific individual purposes to which they address, they differ from the present invention as hereinafter contrasted.

SUMMARY OF THE INVENTION

The present invention includes a system for facilitating the diagnosis and servicing of vehicles. The system includes a computer in communication with a keyboard and or mouse, a CRT, and a data storage medium. The data storage medium is preferably a CD, although other mediums can be used as well, which contain information specific to the same of similar vehicle as the user. The CD further includes data pertaining to various noises or sounds that the vehicle can make when it is in need of repair. For example, one sound contained on the CD is the grinding sound brakes make when worn. The computer includes at least one speaker for producing audio sounds, such as the grinding of brakes, for listening by the user.

The computer includes an internal memory housing a resident program of instructions. The program presents a series of menu screens displayed on the CRT which allow the user to "point and click" to change screens and select the noise or sound the user wants to listen to. The initial screen displayed on the CRT displays perspective views of a vehicle which, together, allows the user to see the entire exterior of the vehicle, except parts of the undercarriage. The user can point to various positions on the vehicle and click to go to another page providing more detail regarding that area of the vehicle. The areas of the vehicle which can be "pouint and clicked" by the user include the: front right wheel, front left wheel, rear left wheel, rear right wheel, left front door, left rear door, right front door, and right rear door. In addition to the point and click options on the vehicle, the, the initial screen displays a list of selectable links to other screens pertaining to specific areas of the vehicle, including: "Exit", "Menu of Sounds", "Engine", "Exhaust", "Transmission", "Front End", "Rear End", "Braking", "Interior", "Front", "Middle", and "Rear".

Through user seclection, the user can narrow down the area of the vehicle he is interested in, then once the area is located, point and click on the screen to have the a noise produced. The user listens to the noise selected to match the computer generated noise to that which the user heard previously and sought to have inspected for repair. Finally, the user can use the program to clearly relate to the shop the area and noise of the vehicle which may require repair, thereby reducing the amount of time that the repairman is required to locate and diagnose the problem.

The novel features which are considered characteristic for the device are set forth in the appended description. The invention itself, however, both as to its construction and its method of operation, together with additional objects and advantages thereof, will be best understood from the following description of the specific embodiments when read and understood in connection with the accompanying drawings.

BRIEF LIST OF REFERENCE NUMERALS UTILIZED IN THE DRAWING

10—system
12—computer
14—program
16—disk drive
18—CD
20—CRT
22—keyboard
24—mouse
52—right front wheel
54—right rear wheel
56—left front wheel
58—left rear wheel
60—right front door
62—right rear door
64—left front door
66—left rear door
68—Exit button
70—Menu of sounds button
74—Engine button
76—Exhaust button
78—Transmission button
80—Front end button
82—Rear End button
84—Braking button
86—Interior button
88—Front button
90—Middle button
92—Rear button
101—exhaust manifold leak button
102—fan belt squeal button
103—heat shield rattle button
104—timing tensioner button
105—exhaust rattle button 106—transmission rumble button
107—front wheel bearing roar button
108—tire noise button
109—front shock noise button
110—front end steering stop noise button
111—rear shock noise button
112—brake squeal button
113—brake moan button
114—brake grind button
115—squeaky pedal button
116—glove box rattle button
117—radio rattle button
118—window noise button
119—door window regular loose button
120—opening door noise
200—turn page forward button
202—turn page back button
204—Braking button
206—Engine button
208—Exhaust button
300—Return to Main Menu button
502—Main Menu
503—Menu of Sounds Page 1
504—Menu of Sounds Page 2
505—Menu of Sounds Page 3
506—Menu of Sounds Page 4
507—Right Front Wheel screen
508—Right Rear Wheel screen
509—Left Front Wheel screen
510—Left Rear Wheel screen
511—Right Front Door screen
512—Right Rear Door screen
513—Left Front Door screen
514—Left Rear Door screen
515—Engine Exhaust screen
516—Transmission screen
517—Front End screen
518—Rear End screen
519—Braking screen
520—Interior screen
521—Under Car Front screen
522—Under Car Middle screen
523—Under Car Rear screen

BRIEF DESCRIPTION OF THE PREFERRED EMBODIMENTS

DETAILED DESCRIPTION OF THE PREFERRED EMBODIMENT

Figure 1:
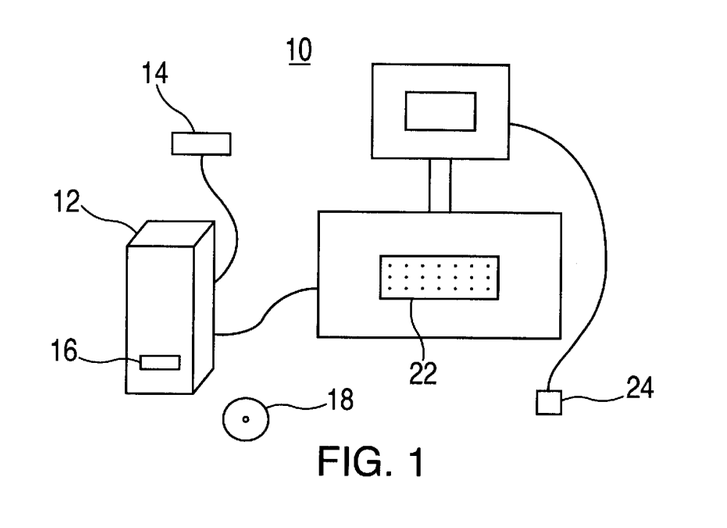
FIG. 1 is a schematic view of a system constructed in accordance with a preferred embodiment of the present invention.

Firstly, referring to FIG. 1, system 10 is shown and includes various computer components illustrated in the form of a personal computer, although other types of computers and user interfaces can be used. Computer 12 includes internal software program 14, and disk drive 16. Disk drive 16 is configure to allow the user to insert CD 18 containing sound and other data specific to the year, make and model of the users vehicle. CRT 20, keyboard 22 and mouse 24 are all in communication with computer 12 and permit the user to input instructions to the computer 12. Mouse 24 provides traditional point and click type selection for the user in relation to images displayed on CRT 20.

Figure 2:
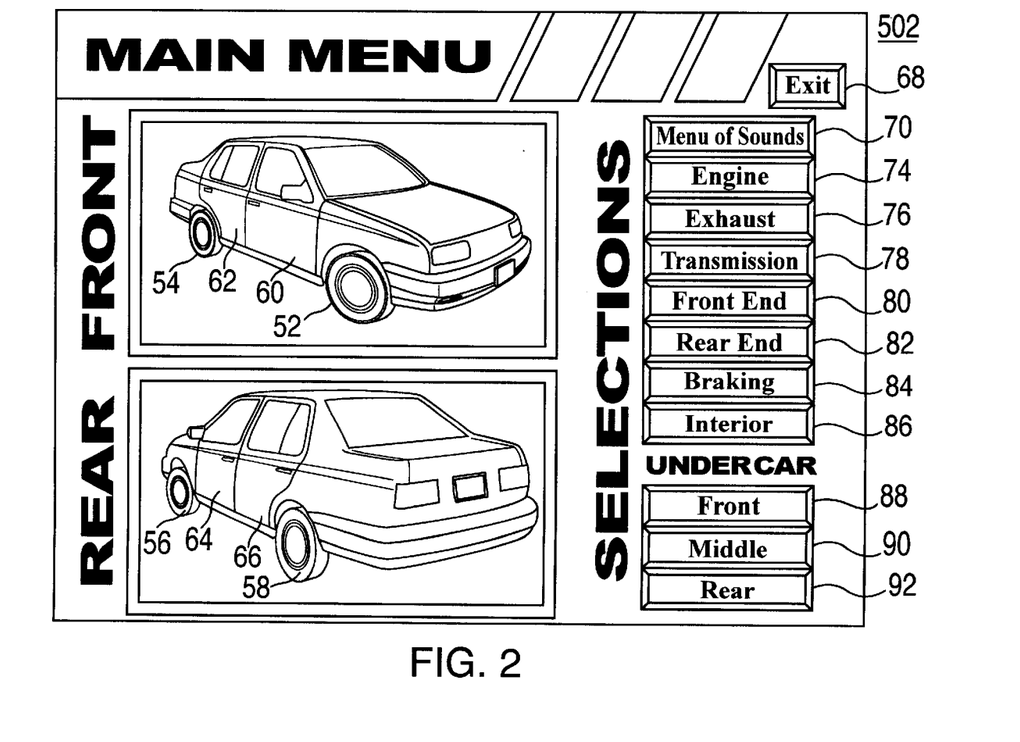
FIG. 2 is an illustrative of the Main Menu screen of the system according to FIG. 1 illustrating the components thereof.
Figure 7:
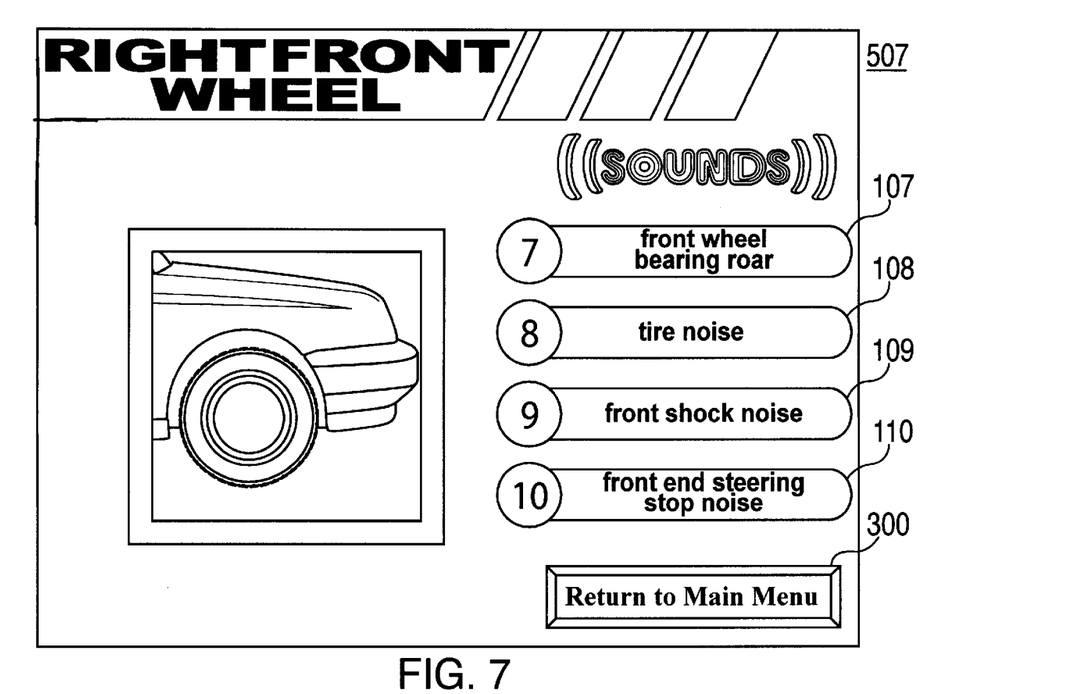
FIG. 7 is an illustrative of the Right Front Wheel screen of the system according to FIG. 1 illustrating the components thereof; thereof.
Figure 8:
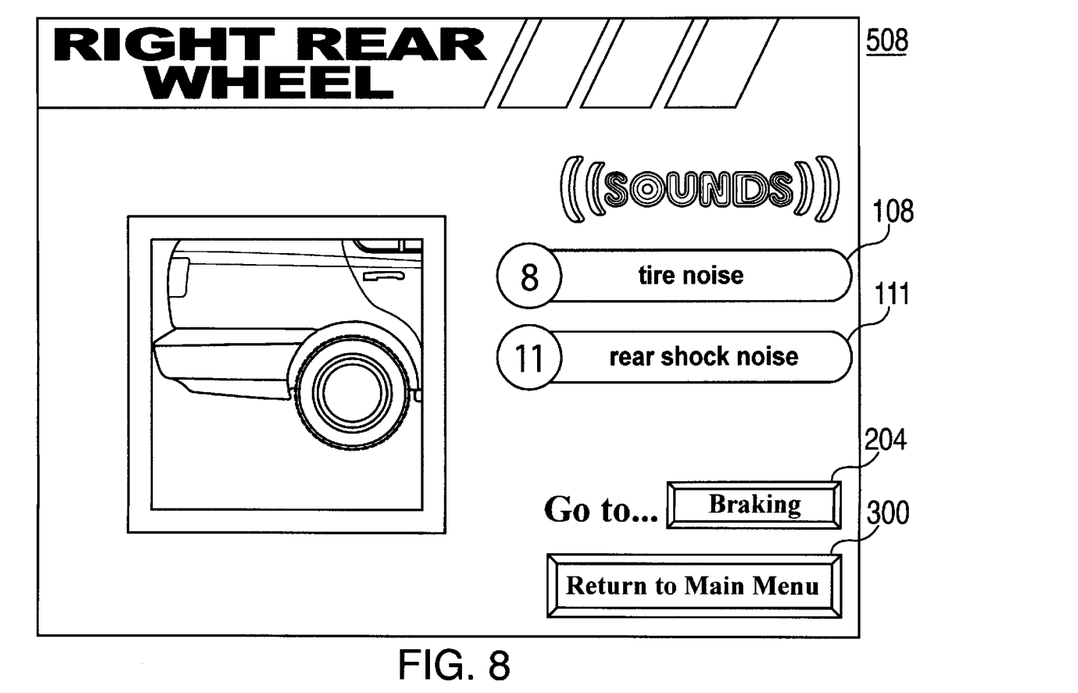
FIG. 8 is an illustrative of the Right Rear Wheel screen of the system according to FIG. 1 illustrating the components thereof.
Figure 9:
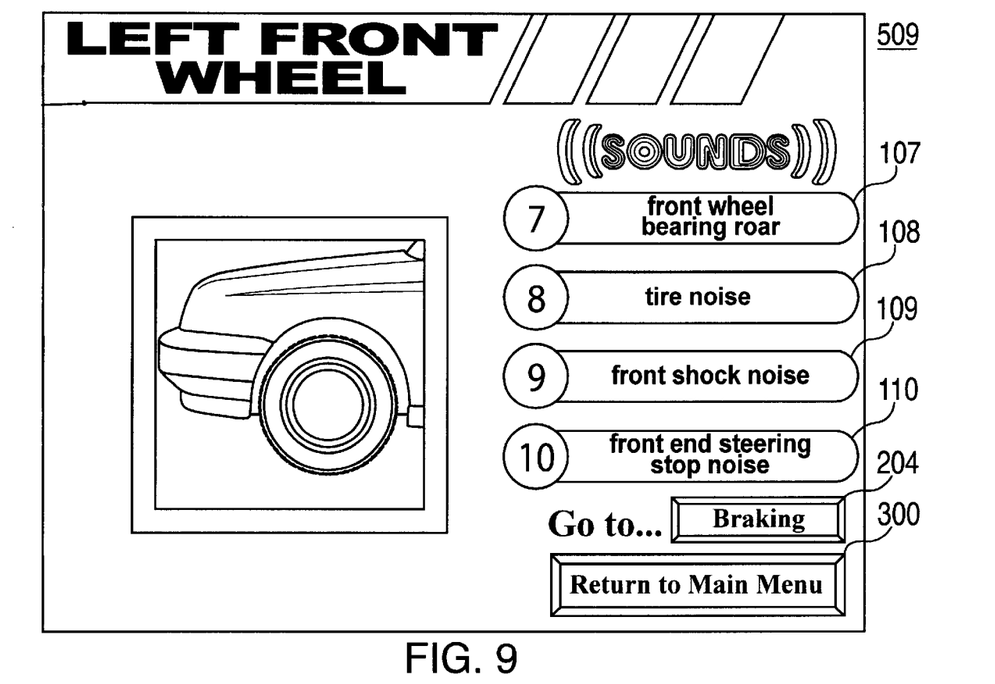
FIG. 9 is an illustrative of the Left Front Wheel screen of the system according to FIG. 1 illustrating the components thereof.
Figure 10:
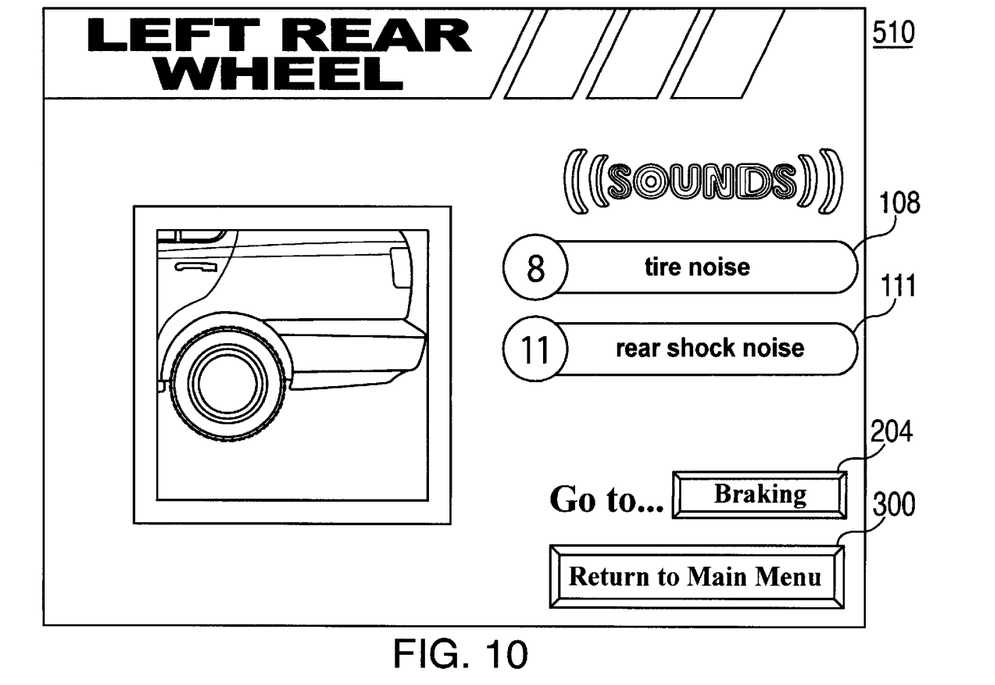
FIG. 10 is an illustrative of the Left Rear Wheel screen of the system according to FIG. 1 illustrating the components thereof.
Figure 11:
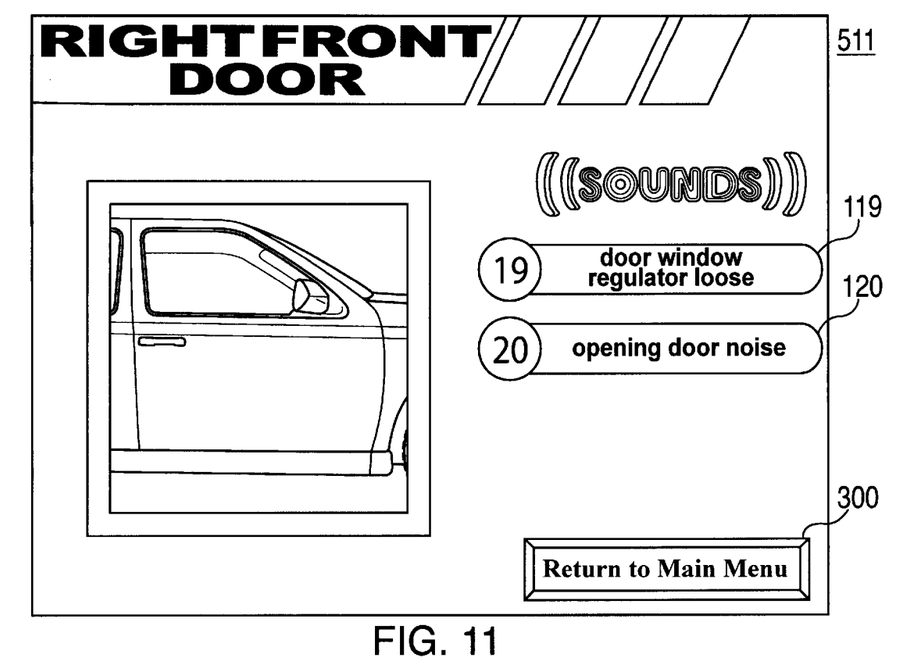
FIG. 11 is an illustrative of the Right Front Door screen of the system according to FIG. 1 illustrating the components thereof.
Figure 12:
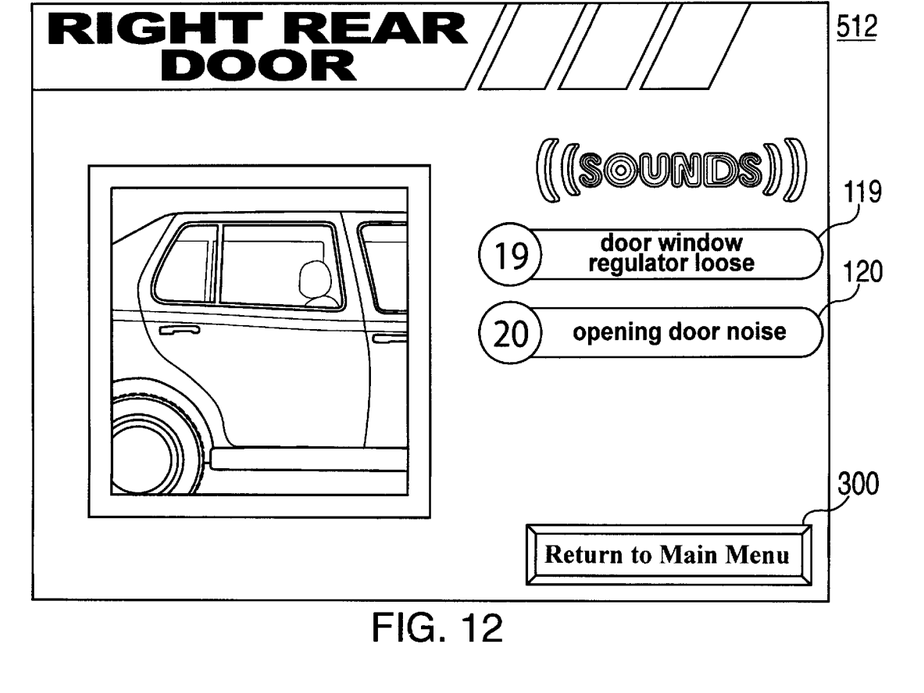
FIG. 12 is an illustrative of the Right Rear Door screen of the system according to FIG. 1 illustrating the components thereof.
Figure 13:
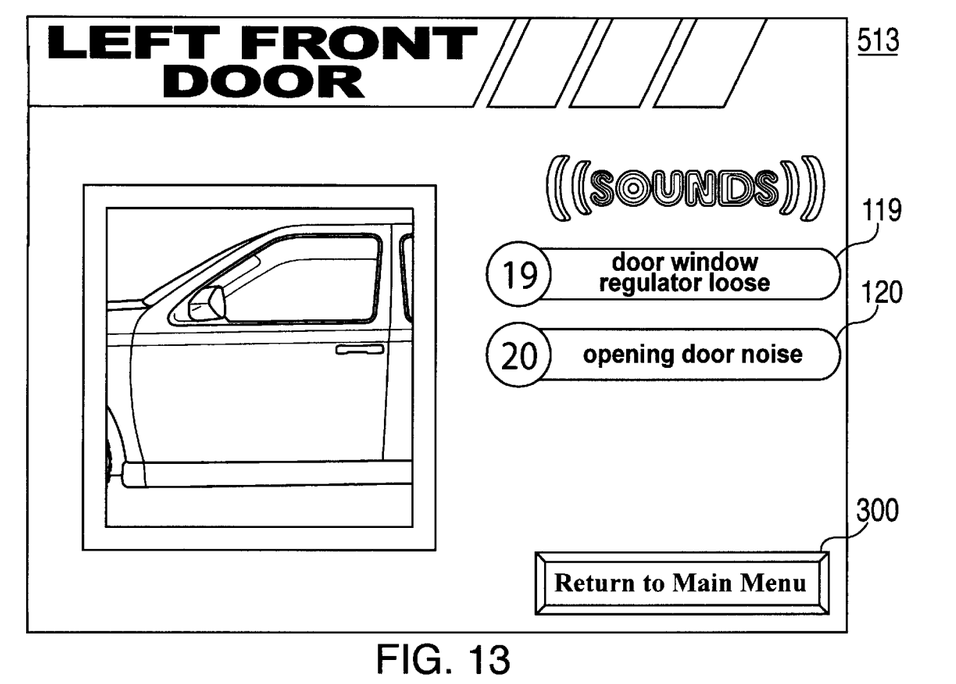
FIG. 13 is an illustrative of the Left Front Door screen of the system according to FIG. 1 illustrating the components thereof.
Figure 14:
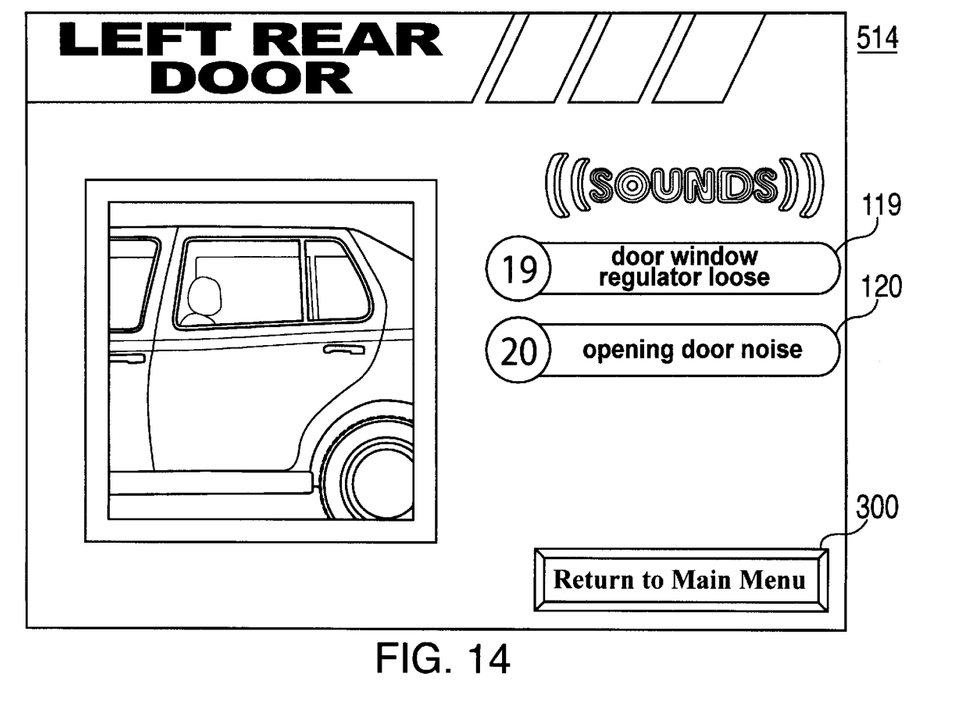
FIG. 14 is an illustrative of the Left Rear Door screen of the system according to FIG. 1 illustrating the components thereof.

Referring now to FIG. 2, Main Menu screen 502 is shown and includes various buttons which when "clicked" by the user, link the user to other screens. Right Front Wheel 52 is shown and when selected by the user links the user to Right Front Wheel screen 507 illustrated in FIG. 7. In similar fashion, Right Rear Wheel 54 links to Right Rear Wheel screen 508 in FIG. 8; Left Front Wheel 56 links with Left Front Wheel screen 509 in FIG. 9; Left Rear Wheel 58 links with Left Rear Wheel screen 510 in FIG. 10; Right Front Door 60 links with Right Front Door screen 511 in FIG. 11; Right Rear Door 62 links with Right Rear Door screen 512 in FIG. 12; Left Front Door 64 links with Left Front Door screen 513 in FIG. 13; and Left Rear Door 66 links with left Rear Door screen 514 in FIG. 14. The user, accordingly, can move to the screen specific to the area of the vehicle by simply moving the cursor to the locations displayed, and click the mouse to move to another more area specific screen.

Figure 3:
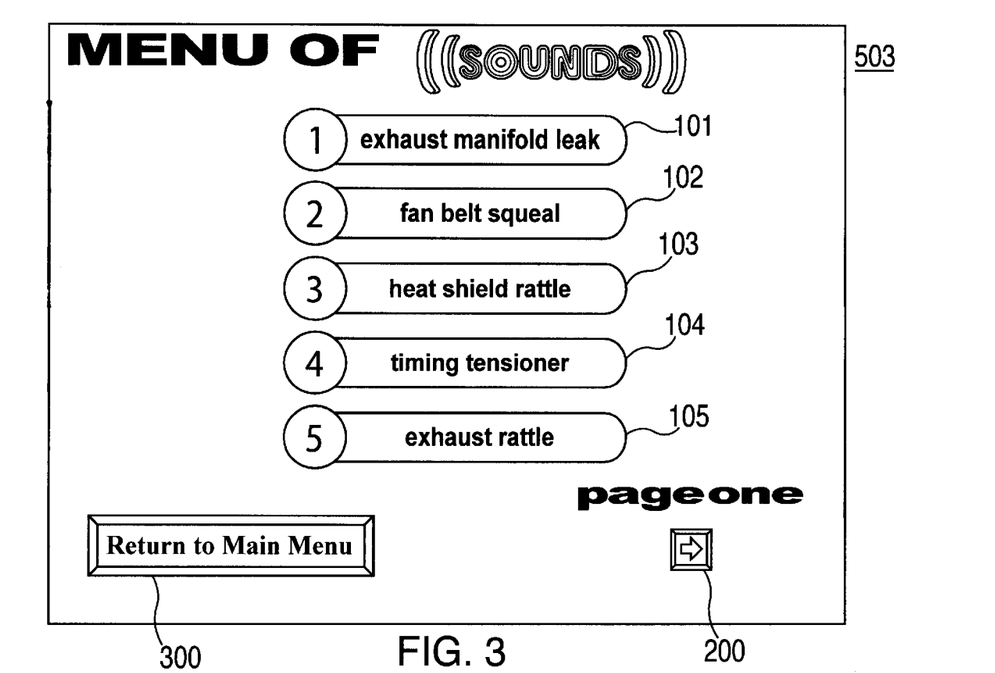
FIG. 3 is an illustrative of the Menu Of Sounds Page One screen of the system according to FIG. 1 illustrating the components thereof.
Figure 4:
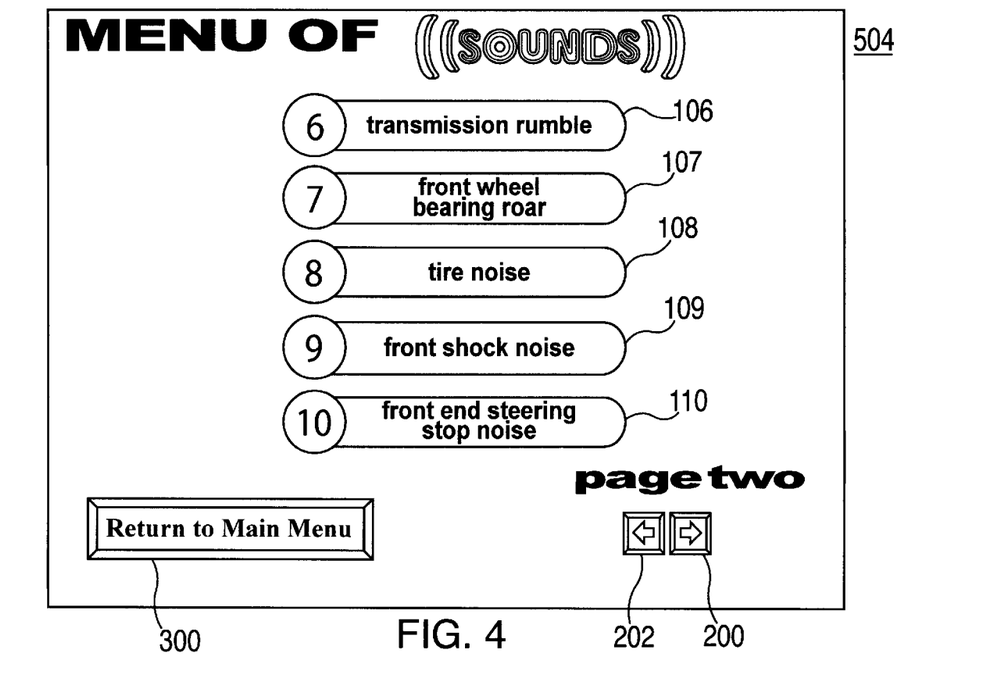
FIG. 4 is an illustrative of the Menu Of Sounds Page Two screen of the system according to FIG. 1 illustrating the components thereof.

Referring once again to FIG. 1, the user in addition to pointing to locations on the vehicles displayed in FIG. 1, can also select buttons arranged in FIG. 1 which are labeled in accordance with the area of the vehicle they pertain too. Exit button 68 allows the user to end the program, while Menu of Sounds button 70 links the user to Menu Of Sounds Page One illustrated in FIG. 3. Referring now to FIG. 3, the user can select exhaust manifold leak button 101, fan belt squeal button 102, heat shield rattle button 103, timing tensioner button 104, and exhaust rattle button 105 to have that specific noise produced. The user can also return to the Main Menu screen 502 by selecting Return to Main Menu button 300. The user can turn the page forward to access Menu Sounds screen 504 shown in FIG. 4 by selecting page forward button 200. With reference to FIG. 4, transmission rumble button 106; front wheel bearing roar button 107, tire noise button 108; front shock noise button 109 , and front end steering stop noise button 110 are provided and produce respective sounds when selected. Page back button 202 allows the user to move to previously displayed page.

Figure 5:
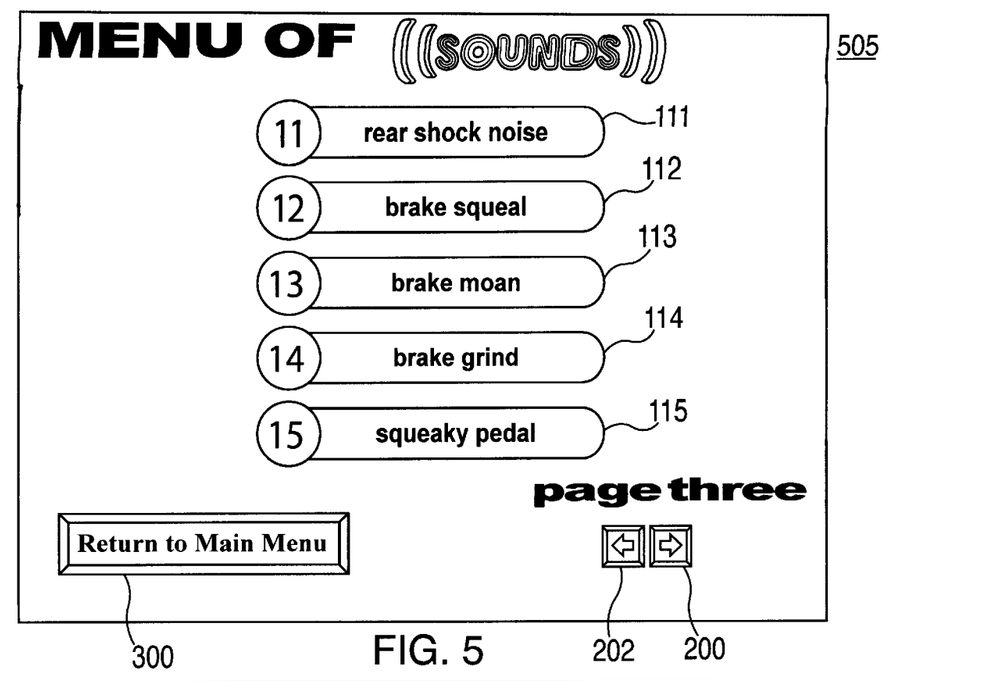
FIG. 5 is an illustrative of the Menu Of Sounds Page Three screen of the system according to FIG. 1 illustrating the components thereof.
Figure 6:
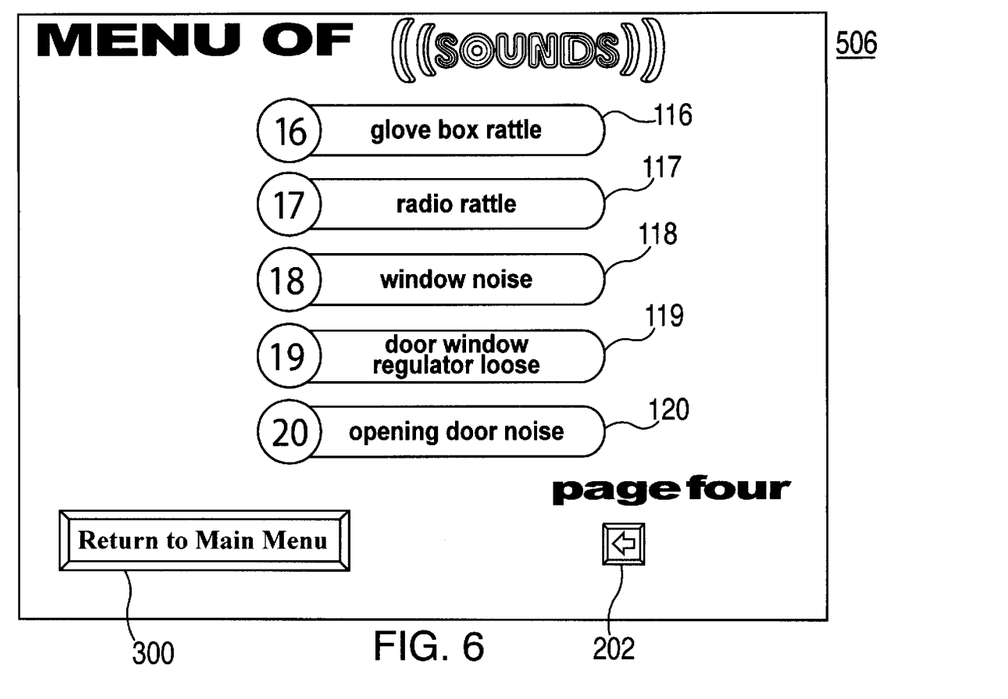
FIG. 6 is an illustrative of the Menu Of Sounds Page Four screen of the system according to FIG. 1 illustrating the components thereof.
Figure 15:
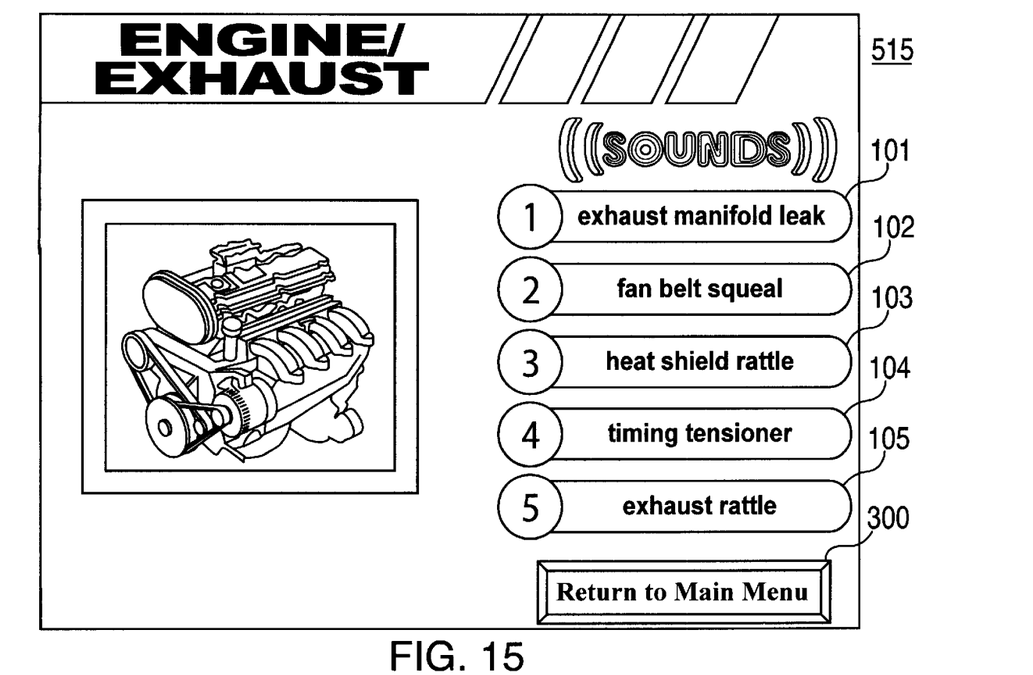
FIG. 15 is an illustrative of the Engine/Exhaust screen of the system according to FIG. 1 illustrating the components thereof.
Figure 16:
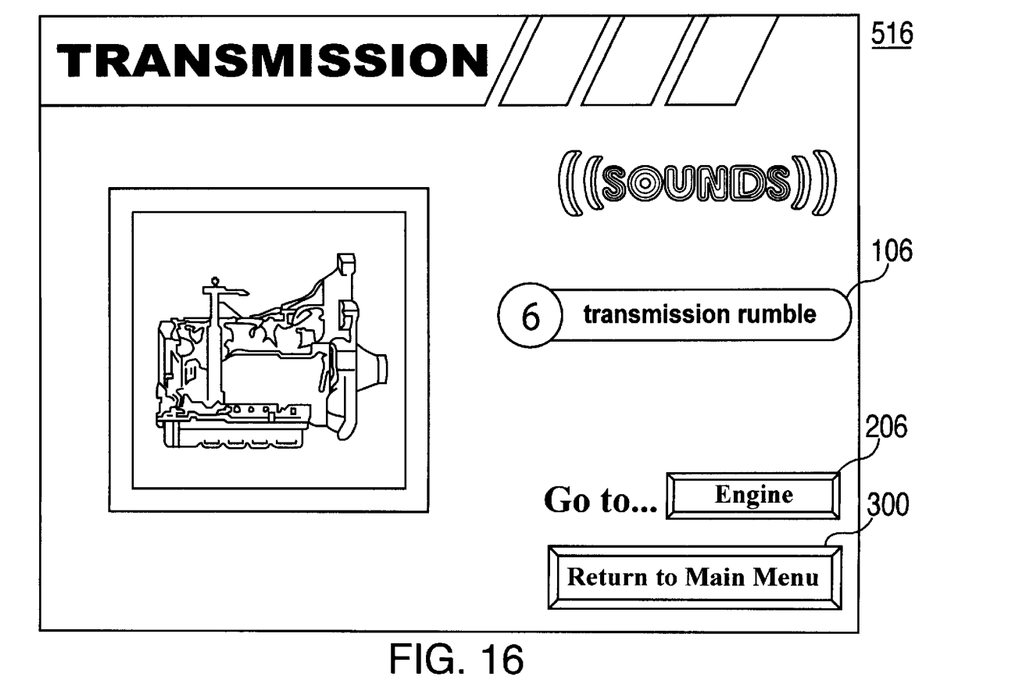
FIG. 16 is an illustrative of the Transmission screen of the system according to FIG. 1 illustrating the components thereof.

Turning your attention to FIGS. 5 and 6, rear shock noise button 111; brake squeal button 112; brake moan button 113; brake grind button 114; squeaky pedal button 115; glove box rattle 116; radio rattle button 117; window noise button 118; door window regulator loose button 119; and opening door noise 120 are provide and according produce appropriate noise when selected. Referring now to FIG. 1 in conjunction with FIG. 15, Engine button 74 and Exhaust button 76 both link the user to Engine/Exhaust screen 515 wherein the user can have sounds played by choosing from exhaust manifold leak button 101, fan belt squeal button 102, heat shield rattle button 103, timing tensioner button 104 and exhaust rattle 105. Transmission button 78 links the user to Transmission screen 516 shown in FIG. 16 wherein the user can select transmission rumble button 106.

Figure 17:
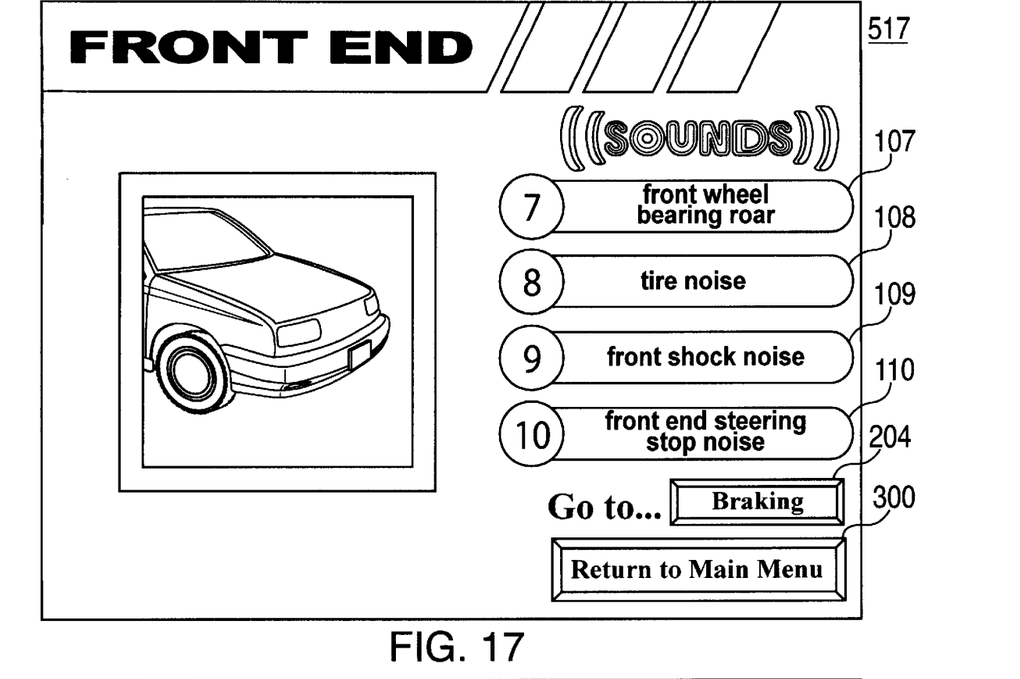
FIG. 17 is an illustrative of the Front End screen of the system according to FIG. 1 illustrating the components thereof.
Figure 18:
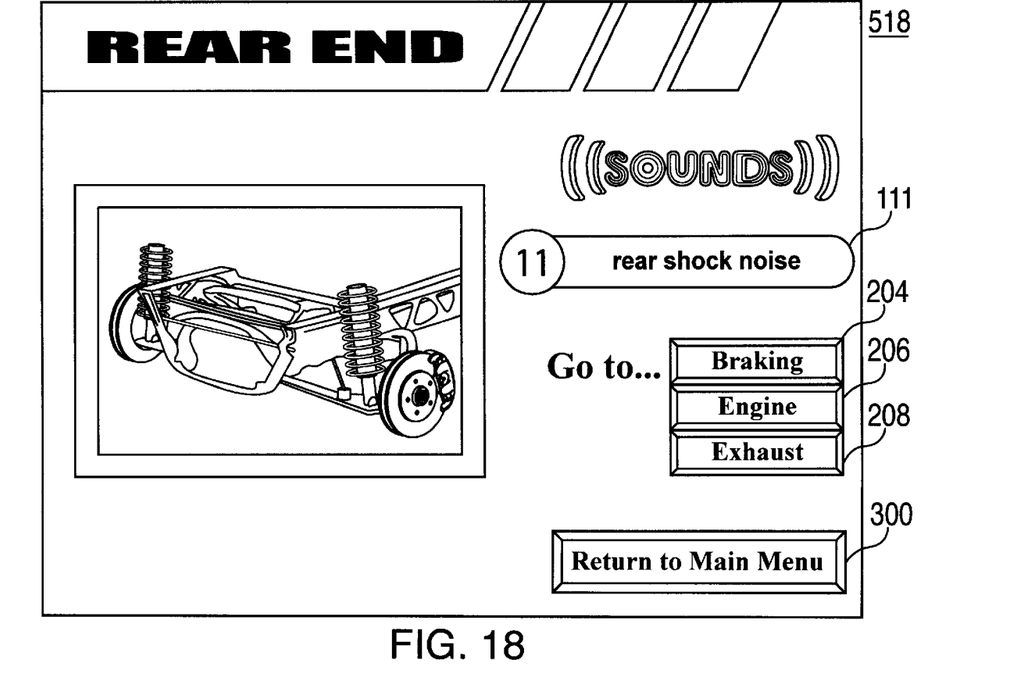
FIG. 18 is an illustrative of the Rear End screen of the system according to FIG. 1 illustrating the components thereof.
Figure 19:
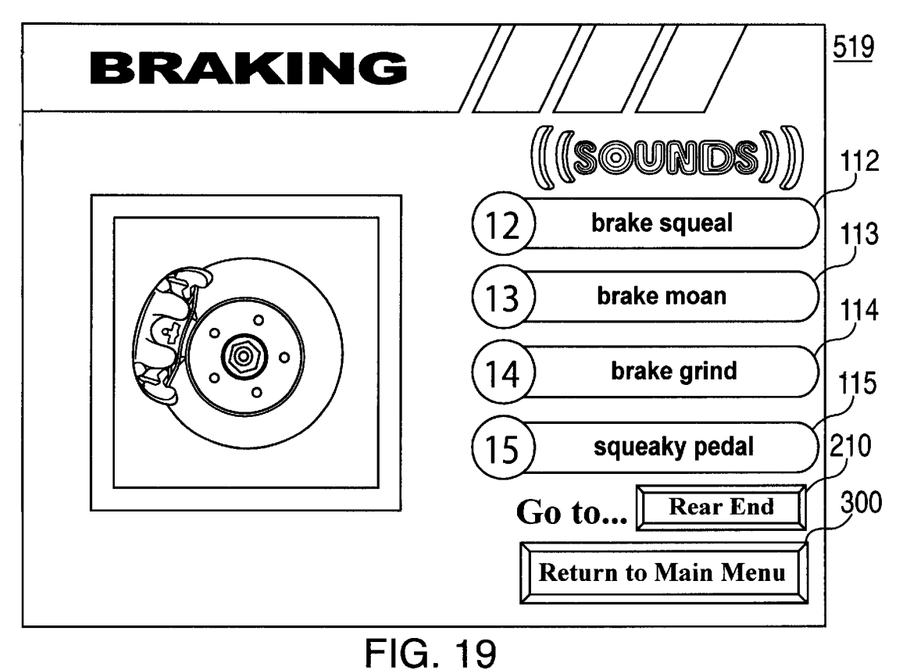
FIG. 19 is an illustrative of the Braking screen of the system according to FIG. 1 illustrating the components thereof.
Figure 20:
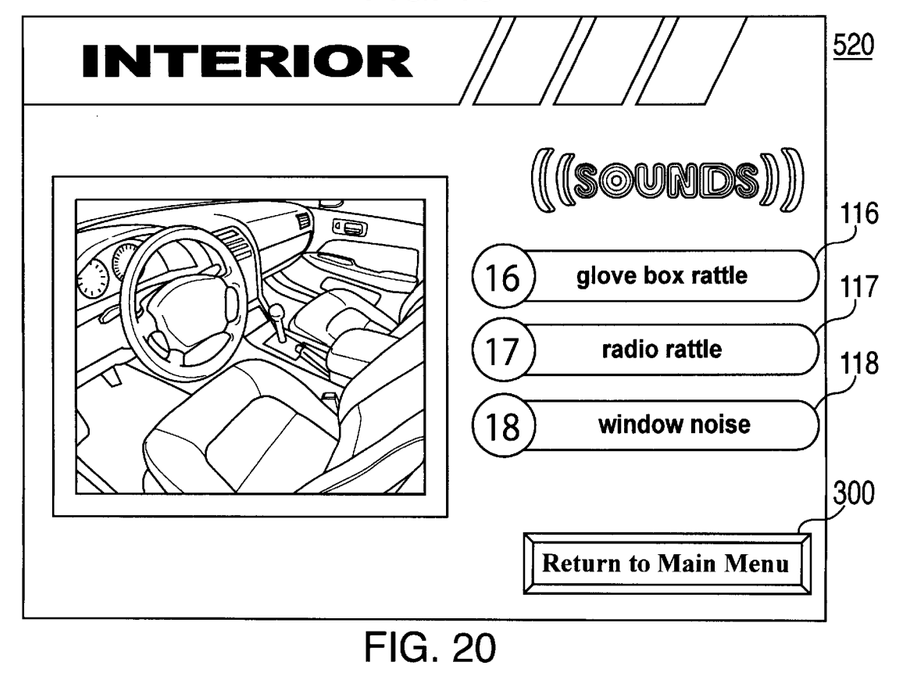
FIG. 20 is an illustrative of the Interior screen of the system according to FIG. 1 illustrating the components thereof.

Referring once again to FIG. 1 in conjunction with FIGS. 17–18, Front End button 80 links the user to Front End screen 517 while Rear End button 82 links the user to Rear End screen 518. Braking button 84 links the user to screen 519 illustrated in FIG. 3 while Interior button 86 links the user to Interior screen 520 illustrated in FIG. 20.

Figure 21:
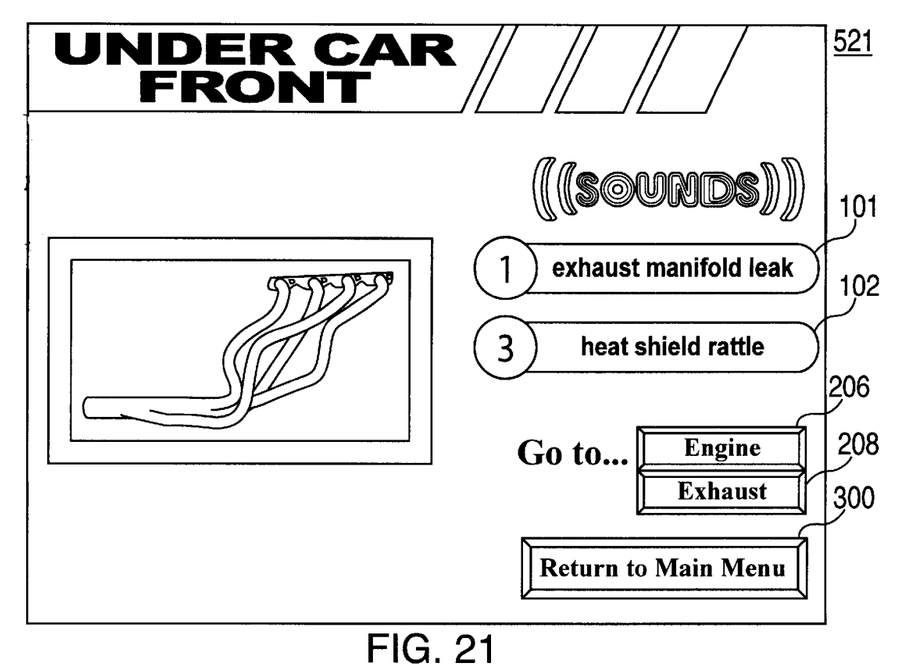
FIG. 21 is an illustrative of the Under Car Front screen of the system according to FIG. 1 illustrating the components thereof.
Figure 22:
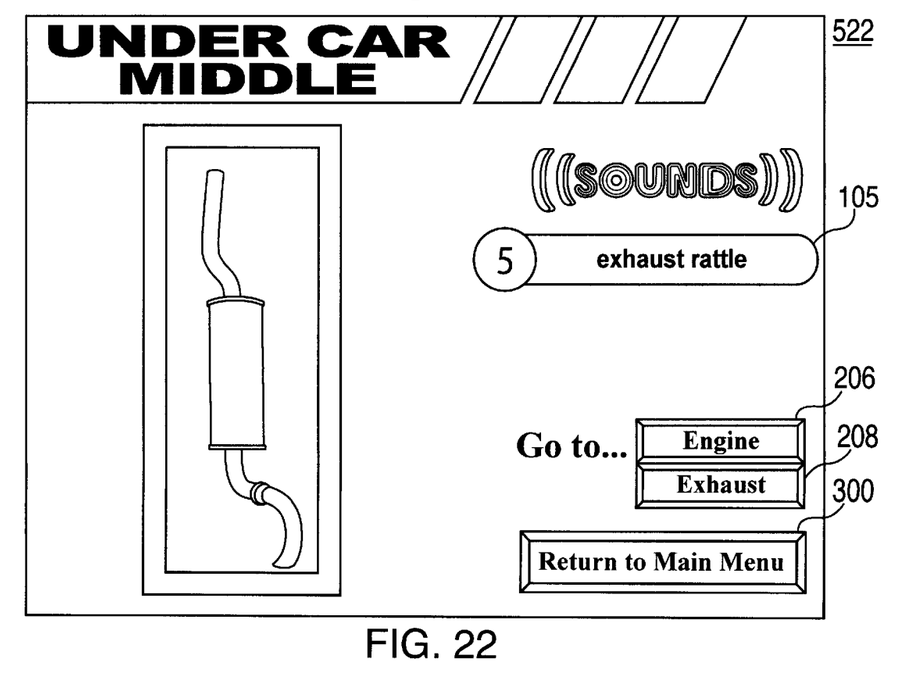
FIG. 22 is an illustrative of the Under Car Middle screen of the system according to FIG. 1 illustrating the components thereof.
Figure 23:
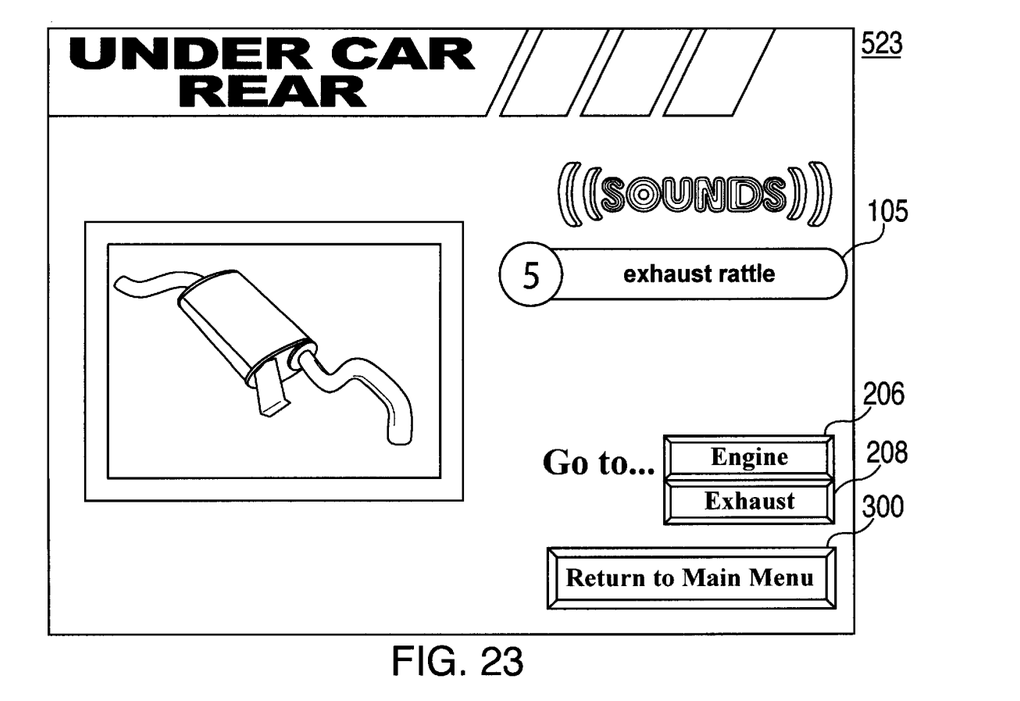
FIG. 23 is an illustrative of the Under Car Rear screen of the system according to FIG. 1 illustrating the components thereof.

Referring now to FIG. 1 in conjunction with FIGS. 21–23, the user can select from choice pertaining to noises from under the vehicle. Front button 88 links the user to Under Car Front screen 521 wherein the user can select exhaust manifold leak button 101 or heat shield rattle button 102. Engine button 206 and Exhaust button 208 link the user to Engine Exhaust screen 515 shown in FIG. 15. Middle button 90 links the user to Under Car Middle screen 522 shown in FIG. 22 wherein the user can select exhaust rattle button 105. Finally, Rear button 92 links the user to Under Car Rear screen 523 as seen in FIG. 23 wherein the user can also select exhaust rattle button 105. Note that many of the buttons, such as return to Main menu button 300, Engine button 206 and Exhaust button 208, appear on multiple screens. This allows the user to quickly and efficiency navigate through the program.

The invention has been illustrated and described as embodied in a system for diagnosing vehicle repairs, it is not intended to be limited to the particular structure disclosed herein, since it will be understood that various omissions, modifications, substitutions and changes in the forms and details of the device illustrated and in its operation can be made by those skilled in the art without departing in any way from the spirit of the present invention. For example, it is envisioned that the system could be used to assist in diagnosing repairs in machines, tools and other devices with known sounds indicating repairs are needed.

What is claimed is:

1. A system for assisting in the diagnosis of vehicles comprising:

means for storing a plurality of vehicular sounds;

means for receiving user input to select at least one of a plurality of said sounds; and means for broadcasting said stored vehicular sounds, wherein said sounds are sounds associated with vehicular problems.

2. A method for diagnosing vehicle problems, comprising the steps of:

providing means for storing a plurality of vehicular sounds;

providing means for receiving user input to select at least one of a plurality of said sounds;

providing means for broadcasting said stored vehicular sounds, wherein said sounds are sounds associated with vehicular problems; and broadcasting a plurality of vehicular diagnostic sounds to a vehicle user whereby said vehicle user can compare actual vehicle sounds previously heard with said broadcast vehicle diagnostic sounds.

* * * * *